United States Patent

[11] 3,612,159

| | | |
|---|---|---|
| [72] | Inventor | Milton L. Galinsky<br>400 Pelletier, Sioux City, Iowa 51104 |
| [21] | Appl. No. | 10,504 |
| [22] | Filed | Feb. 11, 1970 |
| [45] | Patented | Oct. 12, 1971 |

[54] AUTOMATIC MOLD-HANDLING SYSTEM
15 Claims, 15 Drawing Figs.

[52] U.S. Cl. .................................................. 164/324,
25/2, 25/41 D, 164/331, 164/329
[51] Int. Cl. ......................................................... B22d 33/00,
B22d 42/02
[50] Field of Search .................................................. 164/130,
323, 324, 329, 330, 331; 25/2, 41 D

[56] References Cited
UNITED STATES PATENTS

| | | | |
|---|---|---|---|
| 1,069,795 | 8/1913 | Lewis ............................ | 164/324 X |
| 1,641,583 | 9/1927 | Hanley .......................... | 25/2 |
| 1,728,928 | 9/1929 | Crowell ......................... | 25/2 |
| 2,680,270 | 6/1954 | Gedris ........................... | 164/323 |
| 2,798,267 | 7/1959 | Anderson ..................... | 164/323 X |
| 3,123,871 | 3/1964 | Taccone ....................... | 164/323 X |
| 3,259,946 | 7/1966 | Blue .............................. | 164/23 X |

*Primary Examiner*—J. Spencer Overholser
*Assistant Examiner*—Ben D. Tobor
*Attorney*—Zarley, McKee & Thomte ABSTRACT: A mold-handling conveyor system for use with an automatic match plate molding machine adapted to produce sand molds on a perforated bottom board. First, second, third and fourth track mean are laterally positioned with respect to each other with one end of the first track means positioned adjacent the molding machine. Movable pallets are mounted on the track means in an end-to-end relationship. Means is provided at the machine end of the first track means for receiving the bottom board and mold thereon. A first transfer means extends between the far ends of the first and second track means for transferring the pallets from said first track means onto said second track means. The weights and jackets are shifted from the molds on the pallets on the second track means to the molds on the pallets on the first track means. A second transfer means extends between the machine ends of the second and third track means for transferring the pallets from said second track means to said third track means. A third transfer means extends between the far ends of the third and fourth track means for transferring the pallets from the third track means to the fourth track means. A casting removal means is provided at the third transfer means which removes the casting from the bottom board and drops the casting onto a conveyor. A fourth transfer means extends between the machine ends of the first and fourth track means for moving the pallets from the fourth track means into position adjacent the first track mean so that the pallet may again receive a bottom board and mold thereon. A bottom board removal means is provided at the fourth transfer means for removing the bottom board from the pallet as it is being moved to the position adjacent the machine end of the first track means. Power means are provided for operating the various transfer means. A control means is connected to the power means for coordinating the movement of the pallets with respect to the operation of the molding machine.

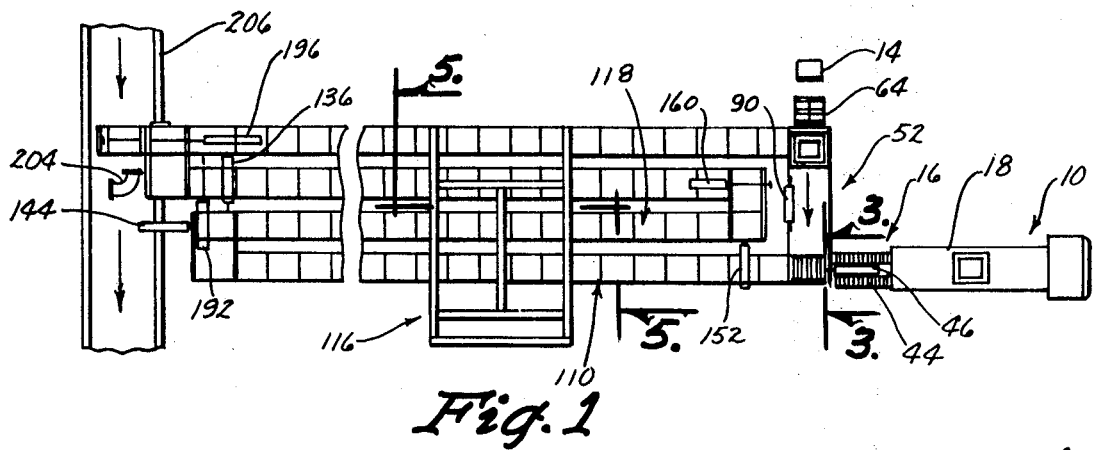
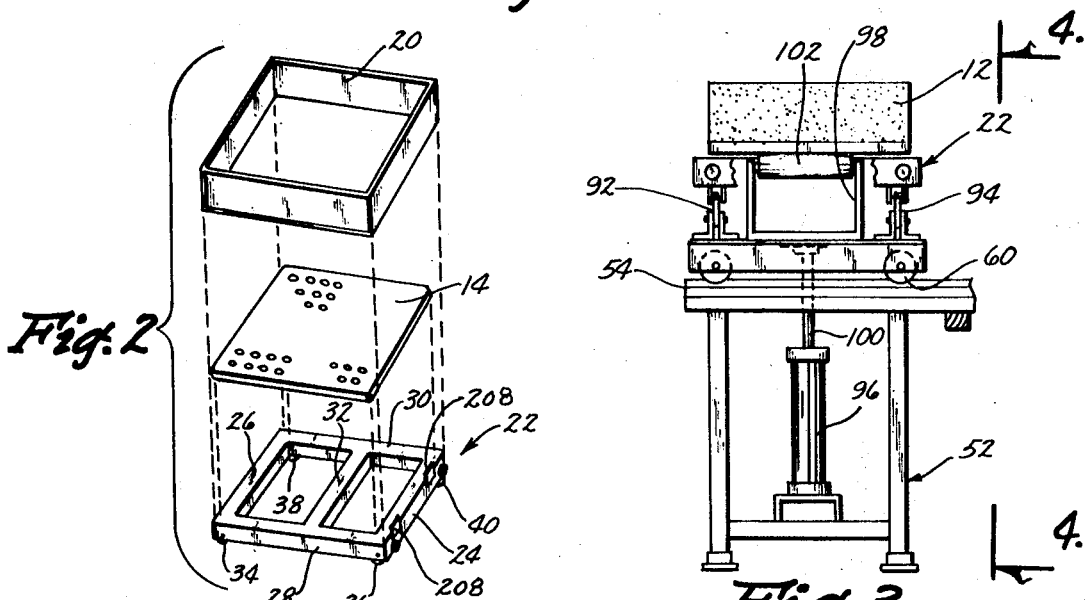

INVENTOR
MILTON L. GALINSKY
BY
Zarley, McKee & Thomte
ATTORNEYS

INVENTOR
MILTON L. GALINSKY
BY
Zarley, McKee & Thomte
ATTORNEYS

AUTOMATIC MOLD-HANDLING SYSTEM

It is the principal object of this invention to provide a mold-handling system.

It is a further object of this invention to provide an automatic mold-handling system especially well adapted for use with a Hunter automatic match plate molding machine.

A further object of this invention is to provide an automatic mold-handling system which reduces the number of persons normally needed for such an operation.

A further object of this invention is to provide an automatic mold-handling system having a control means associated therewith which coordinates the operation of the various transfer and power means.

A further object of this invention is to provide an automatic mold-handling system adapted to handle molds which are positioned on perforated bottom boards.

A further object of this invention is to provide an automatic mold-handling system which is durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a top plan view of the system.

FIG. 2 is an exploded perspective view of the pallet, bottom board and jacket.

FIG. 3 is an enlarged sectional view as seen along lines 3—3 of FIG. 1 with portions thereof cut away.

FIG. 4 is a side elevational view as seen along lines 4—4 of FIG. 3.

Figure 5:
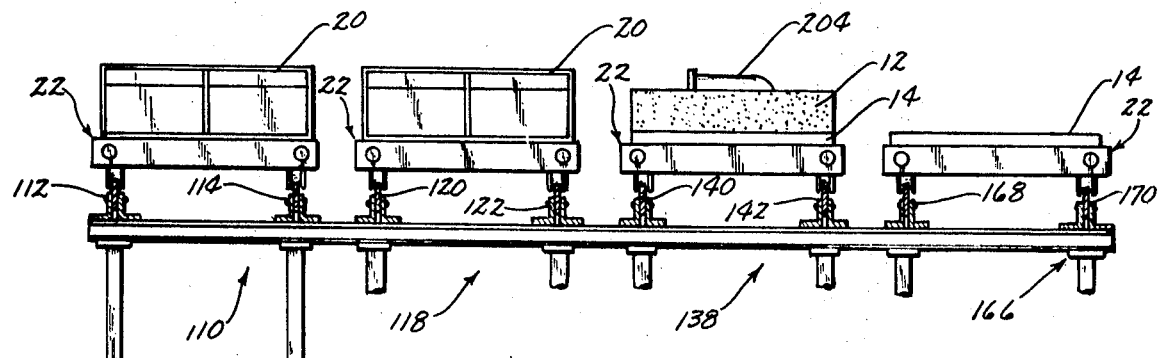
FIG. 5 is an enlarged sectional view as seen along lines 5—5 of FIG. 1.

The numeral 10 designates a molding machine such as a Hunter squeeze molder, adapted to produce sand molds 12 at a predetermined rate upon a perforated bottom board 14 and to eject the same onto a roller conveyor 16. The molding machine operator manually places the bottom board 14 into the machine from the side 18 thereof. The numeral 20 refers to a jacket which is subsequently conventionally placed on the mold 12 prior to the mold being poured. Weights (not shown) would also be placed on the molds 12 in conventional fashion. This invention therefore relates to an automatic conveyor system for handling those molds 12 which are produced by the molding machine 10.

A plurality of pallets 22 are used in this system comprising generally ends 24 and 26, sides 28 and 30, and center support 32. The sides, ends and center support are formed of inverted U-shaped channel members. Each of the pallets 22 includes spaced-apart wheels 34 and 36 at side 28 and wheels 38 and 40 at side 30. The pallet wheels are each provided with a groove formed in the peripheries thereof to aid in maintaining the pallets on the tracks or rolls upon which they move.

The roller conveyor 16 is supported by legs 42 and includes a plurality of spaced-apart rotatable roller elements 44 which are rotatable about a horizontal axis which is transverse to the direction in which the sand molds 12 are ejected from the machine 10. An air cylinder 46 is secured to the conveyor 16 and includes an extendible piston rod 48 having an L-shaped angle 50 secured to its outer end adapted to end 24 of a pallet 22 to move the same away from the conveyor 16 as will be explained in more detail hereinafter.

Figure 10:
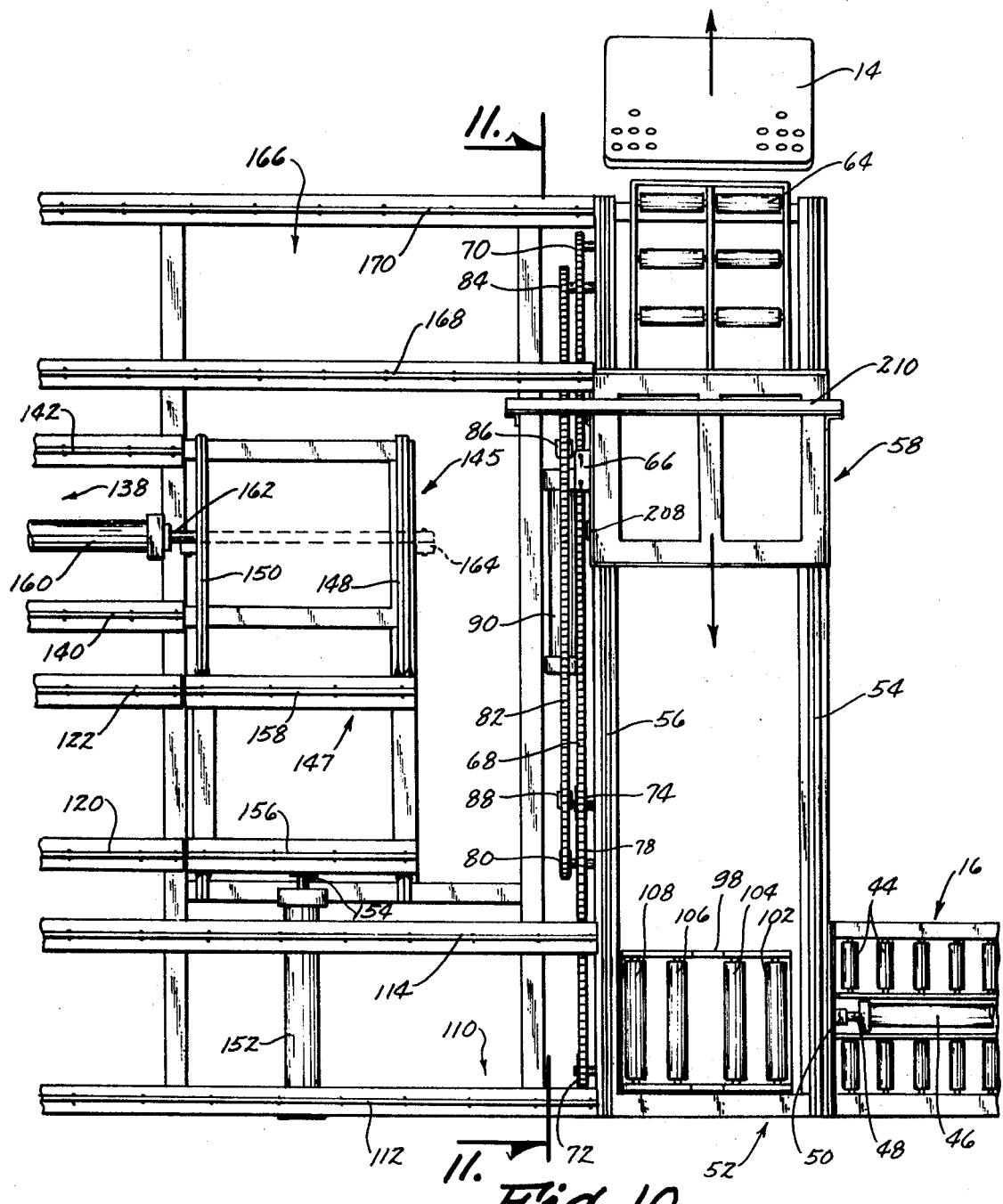
FIG. 10 is a fragmentary top elevational view of the machine end of the conveyor system.
Figure 11:
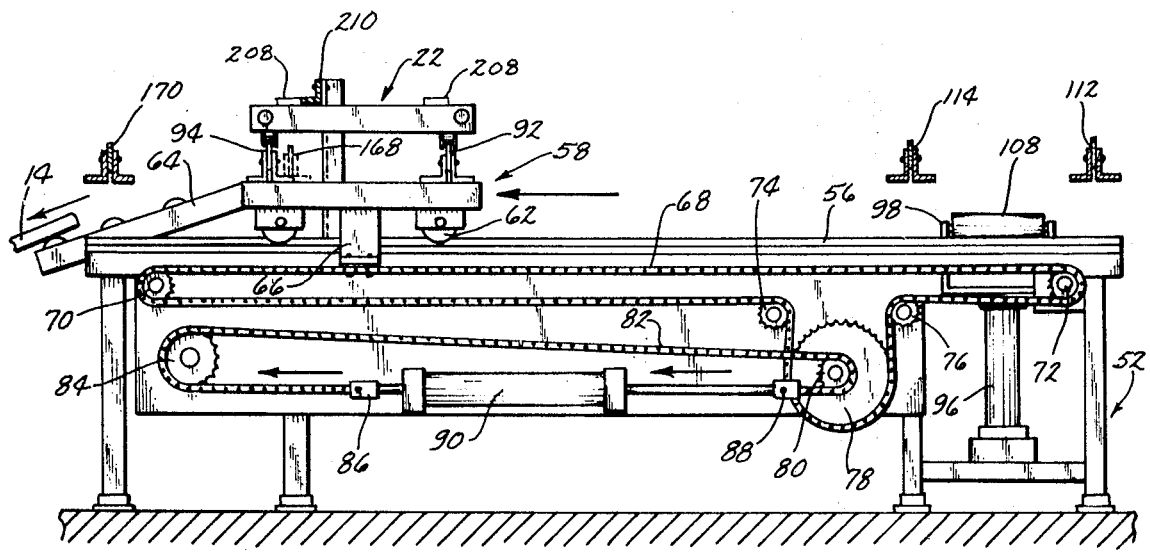
FIG. 11 is a sectional view as seen along lines 11—11 of FIG. 10.

The numeral 52 generally designates a support means having one end thereof positioned adjacent the outer end of roller conveyor 16 with its outer end positioned laterally therefrom as shown in FIG. 1 and FIG. 10. Support means 52 has a pair of spaced-apart tracks or rails 54 and 56 provided therein which extend from one end to the other end thereof. A carriage 58 is movably mounted on support means 52 and includes a pair of wheels 60 at one side thereof which roll on track 54 and a pair of wheels 62 at the other side thereof which roll on track 56. An inclined roller conveyor 64 extends outwardly from one end of carriage 58 adapted to convey a bottom board 14 outwardly from the carriage as will be discussed hereinafter. Bracket 66 is secured to one side of carriage 58 and extends downwardly and outwardly therefrom as seen in FIG. 11. The lower end of bracket 66 is bolted to a chain 68 which extends between sprockets 70 and 72. Chain 68 also extends around idler sprockets 74 and 76 and around sprocket 78 in the manner shown in FIG. 11. Sprocket 80 is operatively secured sprocket 78 for rotation therewith. Chain 82 extends around sprockets 80 and 84 and has its opposite ends connected to the outer ends of rods 86 and 88 respectively extending outwardly from an air cylinder 90 which is secured to support means 52. Thus, movement of the rods 86 and 88 to the left with respect to the cylinder 90 as viewed in FIG. 11 causes the carriage 58 to be moved to the right. Carriage 58 has a pair of spaced-apart tracks 92 and 94 on its upper end which are transverse to tracks 54 and 56. Tracks 92 and 94 are adapted to support a pallet 22 thereon as illustrated in FIG. 11.

A vertically disposed air cylinder 96 is secured at its base to support means (FIGS. 4 and 11) between tracks 54 and 56 at one end thereof. A roller support 98 is secured to the upper end of rod 100 which extends from cylinder 96. Roller support 98 rotatably supports rollers 102, 104, 106 and 108 thereon which are rotatable about a horizontal axis. When rod 100 is raised, assuming that carriage 58 is in the position of FIG. 4, rollers 102, 104, 106 and 108 are raised upwardly through carriage 58 and the pallet 22 thereon so that the rollers are in the same plane as the rollers 44 to permit the bottom board 14 being ejected from the machine 10 to easily roll into a position directly over the carriage 58 and the pallet 22 thereon. When the bottom board 14 has been so positioned, cylinder 96 is operated to lower rod 100 so that rollers 102, 104, 106 and 108 lower the bottom board 14 onto the pallet 22 on the carriage 58.

A support means 110 extends transversely from one end of support means 52 and supports tracks or rails 112 and 114 thereon adapted to support a plurality of pallets 22 thereon in an end-to-end relationship. Cylinder 46 successively pushes the pallet 22 on carriage 58 onto tracks 112 and 114 which causes all of the pallets on tracks 112 and 114 to be successively moved away from machine 10 towards the other end of support means 110.

In FIG. 1, the numeral 116 designates a pouring station where the molds are poured. The jackets and weights are placed on the molds at a location between station 116 and machine 10 and preferably just ahead of station 116. A support means 118 is positioned laterally of support means 110 and supports tracks 120 and 122 thereon adapted to support pallets 22 thereon in an end-to-end relationship. As seen in FIG. 1, the outer or left ends of support means 118 and 110 terminate adjacent each other. As also illustrated in FIG. 1, the right or inner end of support means 118 terminates outwardly of support means 110. A support means 124 extends between the outer ends of support means 110 and 118 and supports tracks 126 and 128 thereon.

Carriage 130 is movably mounted on tracks 126 and 128 by means of wheels extending downwardly therefrom which roll thereon. Carriage 130 has tracks 132 and 134 extending upwardly therefrom which are parallel to tracks 112 and 114. An air cylinder 136 is operatively secured to support means 138 and has its rod 139 secured to carriage 130 to enable cylinder 136 to move carriage 130 from the position illustrated by solid lines in FIG. 6 to the position illustrated by broken lines in FIG. 6.

Figure 6:
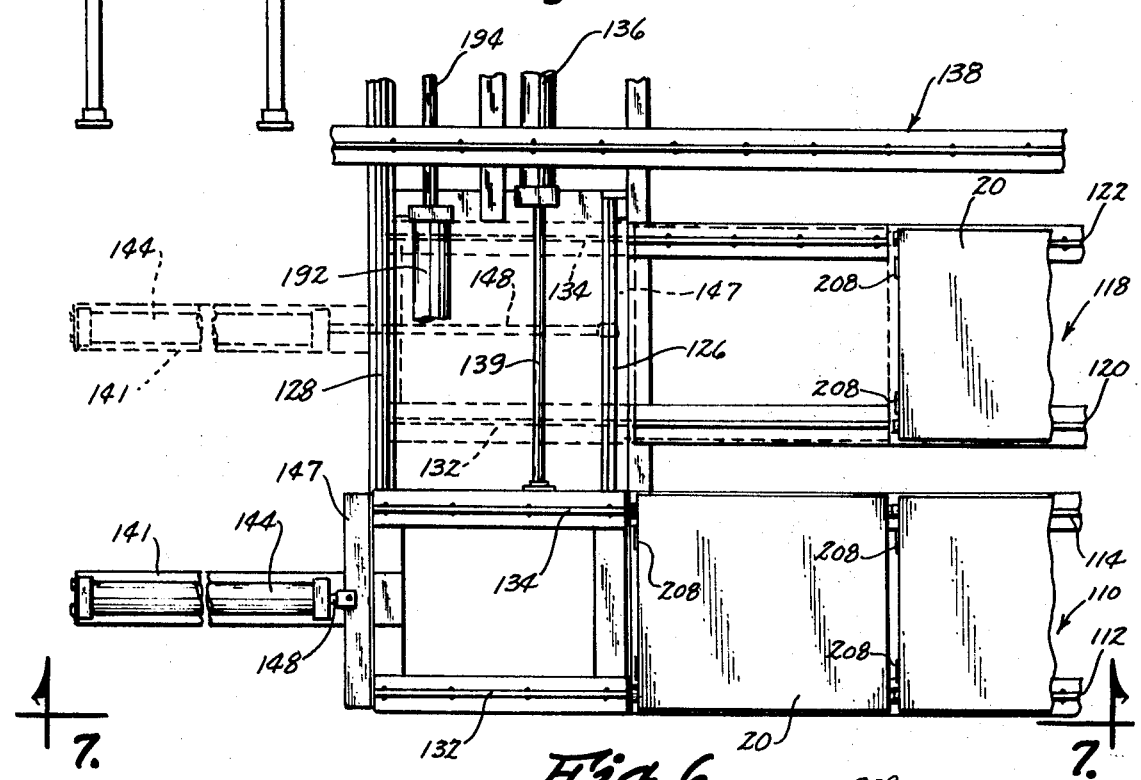
FIG. 6 is a fragmentary top view of the far ends of the first and second track means and the carriage associated therewith.
Figure 7:
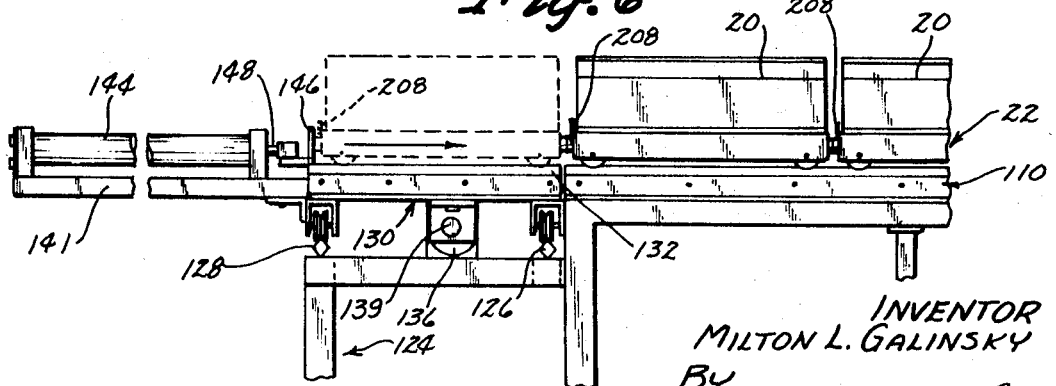
FIG. 7 is a fragmentary side elevational view as seen along lines 7—7 of FIG. 6, the broken lines representing the position of the pallet after it has been moved onto the carriage means.

Cylinder support 141 is secured to carriage 130 as illustrated in FIGS. 6 and 7 for movement therewith. Air cylinder 144 is mounted on support 141 and has an L-shaped bracket or plate 146 secured to the outer end of rod 148 adapted to engage the pallet 22 on carriage 130, when carriage 130 is in the position illustrated by broken lines in FIG. 6, to move the pallet 22 from tracks 132 and 134 onto tracks 120 and 122 of support means 118. The weights and jackets on the molds traveling on pallets 22 on support means 118 are removed therefrom at a point directly opposite when the weights and jackets are placed on the molds on support means 110. In other words, the weights and jackets are taken from the molds on support means 118 and transferred to the molds on support means 110.

Support means 138 is positioned laterally of support means 118 and supports tracks 140 and 142 which are adapted to support the pallets 22 thereon in an end-to-end relationship. Support means 145 is positioned at the other end of support means 138 and has a carriage 147 movably mounted on tracks 148 and 150. Air cylinder 152 is secured to support means 110 with its rod 154 being secured to the carriage 147 to move the carriage 147 from the position illustrated by solid lines in FIG. 10 to a position at the end of support means 138 so that tracks 156 and 158 on carriage 147 are aligned with tracks 140 and 142.

Air cylinder 160 is secured to support means 138 between tracks 140 and 142 as illustrated in FIG. 10. Rod 162 which extends from cylinder 160, has a pivotal finger 164 pivotally secured to its outer end. Finger 164 is adapted to pivot and pass under the pallet 22 on carriage 147, when carriage 147 is in a position adjacent the end of support means 138, as rod 162 is extended. Finger 164 pivots upwardly to engage the pallet 22 and to pull it onto tracks 140 and 142 as rod 162 is withdrawn into cylinder 160.

Figure 8:
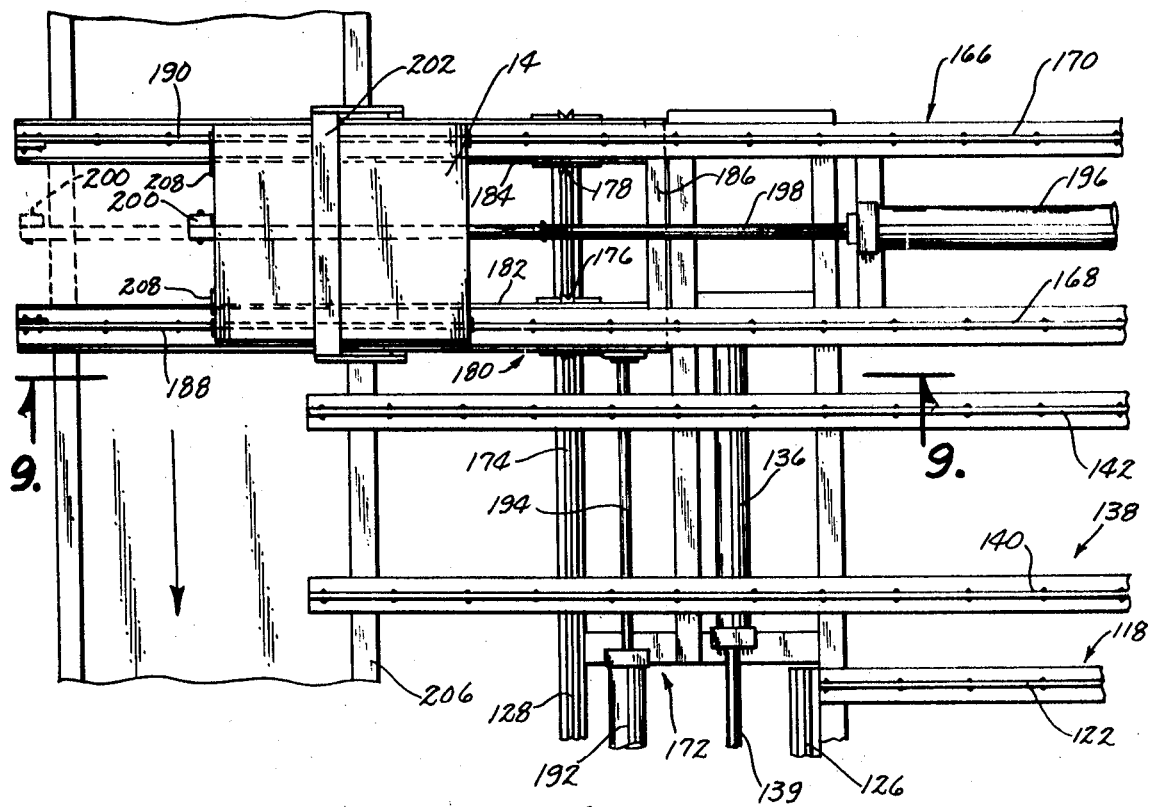
FIG. 8 is a fragmentary top elevation view of the far ends of the third and fourth track means and the carriage movably mounted at the end thereof.

The numeral 166 refers to a support means positioned laterally of support means 138 and supports tracks 168 and 170 which are adapted to support the pallets 22 thereon in an end-to-end relationship. As seen in FIG. 10, one end of support means 166 terminates adjacent the outer end of support means 52. As illustrated in FIG. 8, the other end of support means 166 terminates laterally adjacent the end of support means 138. A support means 172 is secured to the ends of support means 138 and 166 and extends therebetween. Support means 138 has a track 174 mounted thereon adapted to have wheels 176 and 178 of carriage 180 roll thereon. Carriage 180 includes a pair of frame members 182 and 184 having a cross frame member 186 secured to the inner ends thereof and extending therebetween. The wheels 176 and 178 are rotatably secured to frame members 182 and 184 respectively. Frame members 182 and 184 are positioned in a plane below tracks 140, 142 and 168, 170 so that carriage 180 may be moved from the position of FIG. 8 to a position wherein carriage 180 is aligned with support means 138. Cross frame member 186 slidably engages the undersides of tracks 140, 142, 168 and 170 to maintain carriage 180 in a horizontal position. Carriage 180 includes tracks 188 and 190 which are secured to the outer ends of frame members 182 and 184 respectively and extend outwardly therefrom. Air cylinder 192 is secured to support means 172 and has its rod 194 secured to carriage 180 to enable the cylinder to move the carriage 180 between support means 138 and 166.

Figure 9:
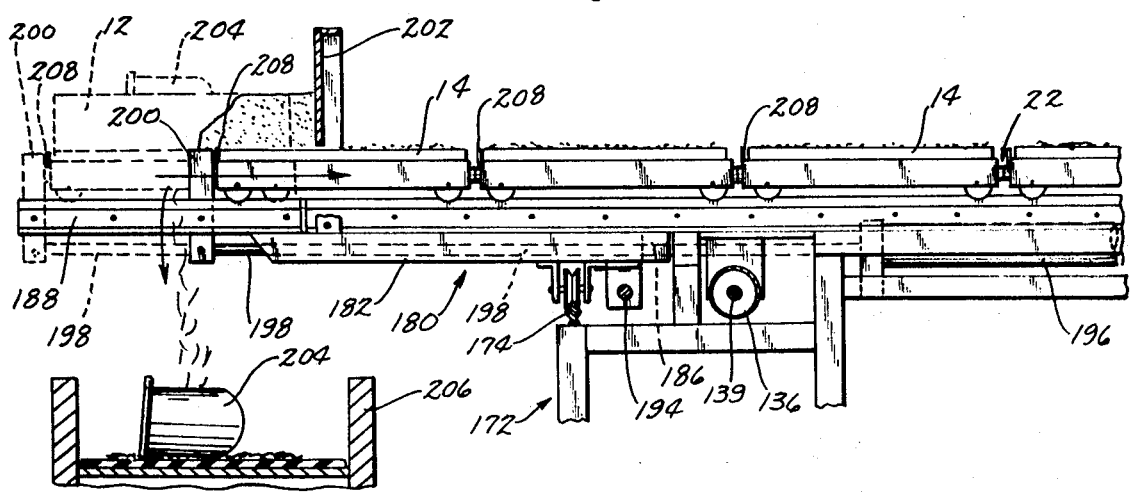
FIG. 9 is a sectional view as seen along lines 9—9 of FIG. 8 illustrating the casting being stripped from the pallet on the carriage means.

An air cylinder 196 is secured to support means 166 between tracks 168 and 170 so that its rod 198 extends outwardly from the ends thereof. A finger 200 is pivoted at its lower end to the outer end of rod 198 so that finger 200 pivots clockwise (FIG. 9) to a horizontal position as rod 198 is extended to permit finger 200 to pass beneath the pallet 22 on tracks 188 and 190 when carriage 180 is at the end of support means 166. Finger 200 is normally vertically disposed and returns to a vertical position after being moved outwardly of the pallet 22 on tracks 188 and 190. Finger 200 engages the pallet 22 on tracks 168 and 170 when cylinder 197 withdraws its rod 198.

Secured to the outer end of support means 166 and extending over and between tracks 168 and 170 is a stripper plate 202. The lower end of stripper plate 202 is spaced above the bottom board 14 on pallet 22 a distance sufficient to strip the casting 204 and mold from the bottom board 14 as cylinder 196 pulls the pallet 22 from tracks 188 and 190 onto tracks 168 and 170. The stripped casting 204 falls onto a conveyor means 206 which is preferably of the oscillating or vibrator type and is then conveyed to a predesignated location.

The tracks 168 and 170 are adapted to have the pallets 22 roll thereon in an end-to-end relationship. As a pallet 22 is moved from tracks 188 and 190 onto tracks 168 and 170, a pallet 22 is moved from the other end of tracks 168 and 170 onto tracks 92 and 94 of carriage 58. Carriage 58 then moves that pallet 22 towards the other end of support means 52. As carriage 58 moves to the right as viewed in FIG. 11, the pallet 22 moved beneath the stripper bar 210 which engages the bottom board 14 on the pallet and causes it to be dropped onto the inclined roller conveyor 64. Roller conveyor 64 allows the bottom board 14 to be deposited outwardly of track 170 to enable the mode operator to move the board 14 to the machine 10 for subsequent use.

Figure 12:
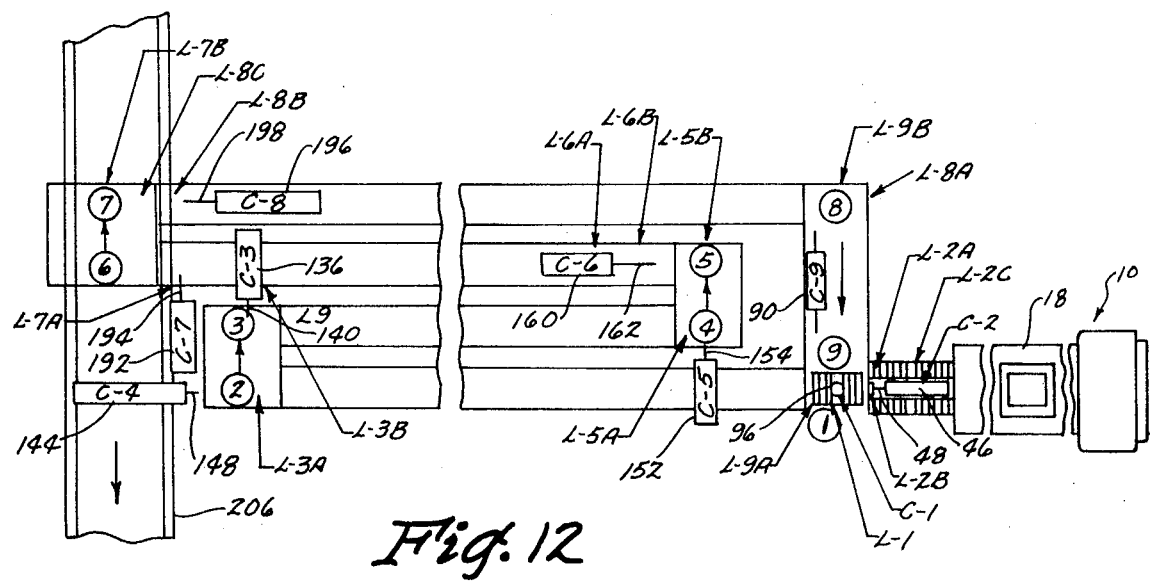
FIG. 12 is a view similar to FIG. 1 except that the locations of the limit switches, cylinders and carriage positions have been labeled.

FIG. 12 is a schematic type view of the system as seen from the above. In FIG. 12, the prefix "C" refers to various air cylinders while the prefix "L" designates conventional limit or microswitches which are positioned on the various components of the system. In FIG. 12, the numbers in circles designate various positions in the system for purposes of the description of the operation.

Figure 13:
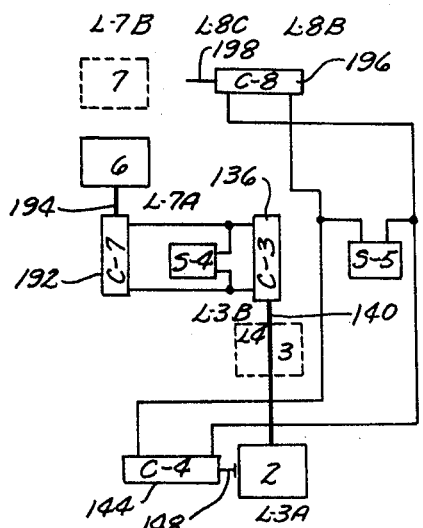
FIG. 13 is a schematic view of a portion of the circuitry for the air cylinders.
Figure 14:
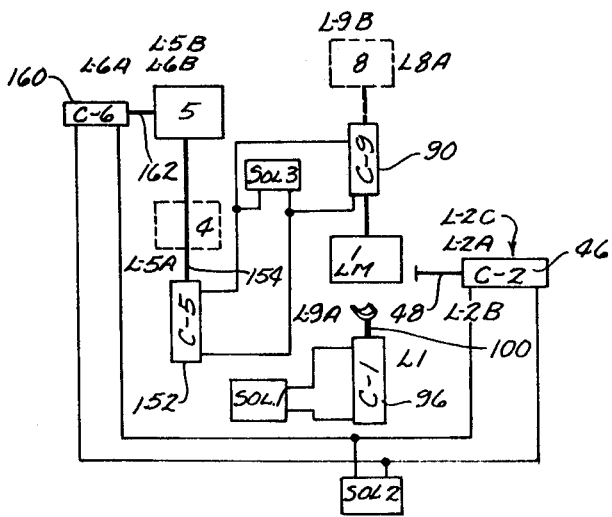
FIG. 14 is a view similar to FIG. 13 which illustrates the remaining portions of the circuitry for the air cylinders.

In FIGS. 13 and 14, the various cylinders are designated by the prefix "C" as well as reference numerals. The prefix "S" has been assigned to various conventional solenoid-operated air valves. The squares having numbers therein designate the positions in the system for purposes of the description of the operation.

Figure 15:
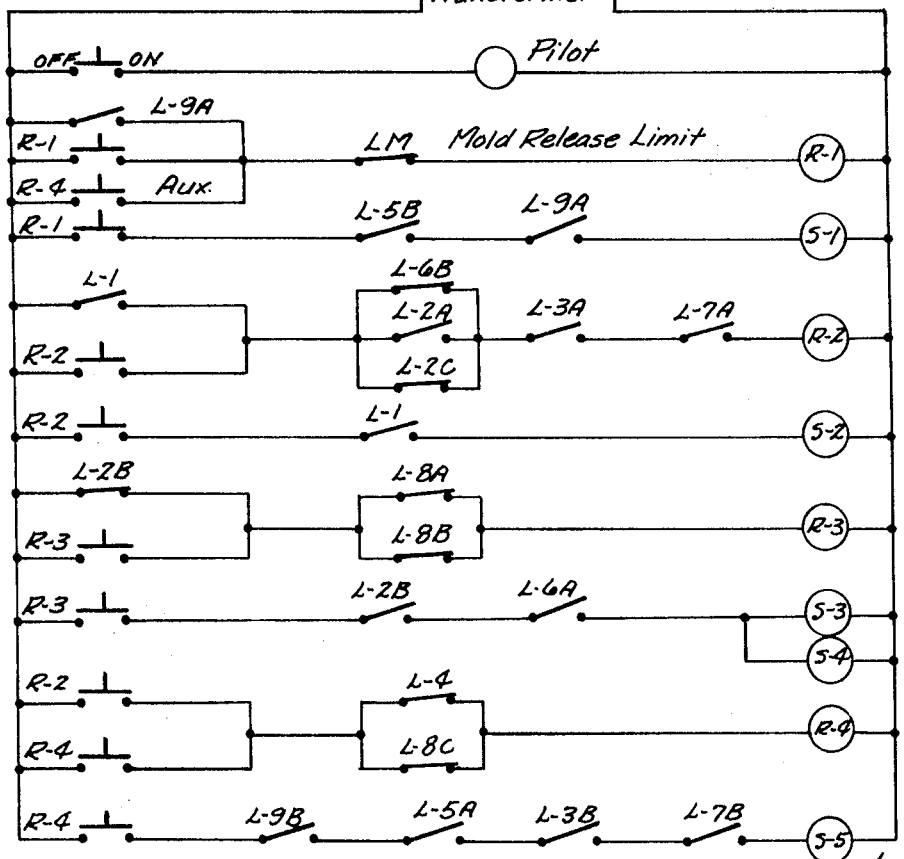
FIG. 15 is a schematic view of the electrical circuit of this invention.

FIG. 15 is a schematic view of the electrical circuit of this system together with its relationship to the solenoid-operated air valves which are designated by the prefix "S." The prefix "R" has been assigned to conventional relays.

The normal method of operation is as follows. At the start of the operation the following components are in the following condition:

| | |
|---|---|
| C-1 (cylinder 96) | rod 100 extended; |
| C-2 (cylinder 46) | rod 48 retracted; |
| C-3 (cylinder 136) | rod 140 extended; |
| C-4 (cylinder 144) | rod 148 retracted; |
| C-5 (cylinder 152) | rod 154 extended; |
| C-6 (cylinder 160) | rod 162 retracted; |
| C-7 (cylinder 192) | rod 194 retracted; |
| C-8 (cylinder 196) | rod 198 retracted; |
| C-9 (cylinder 90) | rod 96 extended. |
| Limit Switch | LM closed |
| | 1 closed |
| | 2a closed; 2b open; 2c closed |
| | 3a closed; 3b open; |
| | L4 closed; |
| | 5a open; 5b closed; |
| | 6a closed; 6b open; |
| | 7a closed; 7b open; |
| | 8a closed; 8b open; 8c closed; |
| | 9a closed; 9b open; |

Carriage 58 is in position 1;
Carriage 146 is in position 5;
Carriage 130 is in position 2;
Carriage 180 is in position 6;

The pallets 22 fill the lines and positions as follows:

Empty pallet on position 1;
Pallets and molds on position 5;
No pallets or molds on positions 2, 3, 4, 6, 7 or 8.

The mold and bottom board pass from the machine 10, onto rollers 44 and onto the pallet 22 on carriage 58 which is in position 1. The board is supported on the rollers 102, 104, 106 and 108, which extend upwardly through the pallet 22, and stops against suitable upstanding stops 208 which are welded on the end of the pallet. The operator opens the limit switch LM to open the circuit in solenoid 1. Rod 100 of cylinder 96 (C–1) retracts thereby engaging L–1 and closing the same thereby energizing R–2. The auxiliary contacts on R–2 energize R–4. When LM switch is activated, R–1 is dropped out thereby energizing S–1 to cause cylinder 96 (C–1 to retract rod 100. When cylinder 96 (C–1) is retracted, it closed the third and fourth contacts of L–thereby energizing S–2.

Solenoid operated air valves S–2 causes cylinders 46 (C–2) and 160 (C–6) to extend. Cylinder 46 (C–2) opens the third and fourth contacts on L–2a and when fully extended, opens the first and second contacts on L–2c and closes the first and second contacts on L–2b which energizes R–3. When fully extended cylinder 160 (C–6) opens the first and second contacts on L–6b which causes R–2 to drop out and cylinders 160 (C–6 and 46 (C–2) to retract. When cylinders 46 (C–2) and 160 (C–6) are retracted, the third and fourth contacts on L–2b are closed and the third and fourth contacts on L–6a are closed thereby energizing S–3 and S–4. 136 (C–3) then retracts to close the third and fourth contacts on L–3b. Cylinder 192 (C–7) extends and closes the third and fourth contacts on L–7b. Cylinder 152 (C–5) retracts to close the third and fourth contacts on L–5a. Cylinder 90 (C–9) retracts and closes the third and fourth contacts on L–9b. When cylinders C–3, C–7, C–5 and C–9 are in the position described above, cylinder 144 (C–4) extends and opens the first and second contacts on L–4 and the first and second contacts on L–8c causing R–4 to drop out. When cylinders 144 and 196 retract, the third and fourth contacts on L–8b are opened and the first and second contacts of L–8a are opened upon the pallet 22 hitting L–8a thereby causing R–3 to drop out. Cylinder 136 extends and closes the third and fourth contacts on L–3a. Cylinder 192 retracts and closes the third and fourth contacts on L–7a.

Cylinder 152 extends and closes the third and fourth contacts on L–5b. Cylinder 90 extends and closes the third and fourth contacts on L–9a. Cylinder 96 then extends and the entire procedure is repeated.

Thus, a system has been described wherein the mold and bottom board are placed on the pallet on carriage 58. Cylinder 46 then pushes that pallet onto tracks 112 and 114 and the end-to-end relationship of the pallets thereon causing the pallet at the far end of the tracks to be pushed onto carriage 130 which is in position 2. The jackets and weights are placed on the molds while the molds are on tracks 112 and 114 as previously described. The molds are also poured while they are on tracks 112 and 114 as also previously described. Cylinder 136 pulls carriage 130 from position 2 into position 3 and cylinder 144 then pushes that pallet from carriage 130 onto tracks 120 and 122. The end-to-end relationship of the pallets on tracks 120 and 122 causes the pallet at the "machine" end of the tracks to be pushed onto carriage 145, which is in position 4, as cylinder 144 pushes the pallet onto the far end of the tracks 120 and 122. The weights and jackets are removed from the molds while they are on tracks 120 and 122 and are transferred to the molds on tracks 112 and 114. Cylinder 152 then extends to move carriage 147 from position 4 to position 5 so that the carriage is at the end of tracks 140 and 142. Cylinder 160 extends its rod 162 beneath the pallet 22 on carriage 147 with the finger 164 pivoting to a substantially horizontal position during the extension of rod 162. When rod 162 is fully extended, finger 164 pivots to its normal vertical position so as to engage the end of the pallet 22. Cylinder 160 then retracts to pull the pallet 22 onto the ends of tracks 140 and 142. Carriage 147 is then returned to position 4 by the cylinder 152.

The end-to-end relationship of the pallets on tracks 140 and 142 causes the pallet at the far end thereof to be moved onto tracks 188 and 190 of carriage 180 (which is in position 6) as the pallet is pulled onto the machine end of the tracks 140 and 142. Cylinder 192 then extends to push the carriage 180 from position 6 to position 7 so that tracks 188 and 190 are aligned with tracks 168 and 170. Rod 198 is then extended from cylinder 196 so that finger 200 is positioned outwardly of the pallet 22 on carriage 180. Cylinder 196 then retracts its rod 198 which causes finger 200 to pull the pallet from tracks 188 and 190 onto the tracks 168 and 170. The casting is stripped from the board 14 as cylinder 196 retracts as previously described to permit the casting to be dropped onto the conveyor 206.

The end-to-end relationship of the pallets on tracks 168 and 170 causes the pallet at the machine end thereof to be moved onto carriage 58 (which is in position 8) as the pallet is pulled onto the far end of the tracks 168 and 170. Cylinder 90 is then activated to move the carriage and pallet thereon from position 8 to position 1 through the sprockets and chains as previously described. Board 14 is removed from the pallet on carriage 58 as carriage 58 moves from position 8 to position 1 due to the stripper bar 210 engaging the same. The board 14 is pushed from the pallet and rolls outwardly or laterally of support means 166 by means of the inclined roller conveyor 64.

When pallet 22 has been moved to position 1, cylinder 96 extends thereby raising the roller support 98 upwardly through carriage 58 so that rollers 102, 104, 106 and 108 are positioned as illustrated in FIG. 4 to permit the board 14 and mold to freely roll onto the pallet 22, until the pallet engages the stop 208, as the board and mold are ejected from the machine 10. The mold operator normally carries the boards 14 from the location where they drop from roller conveyor 64 to the machine. Cylinder 96 is then retracted to lower the board 14 onto the pallet 22.

Thus it can be seen that an extremely unique and efficient conveyor system has been provided for handling molds being produced by a molding machine. The conveyor system is substantially automatic and reduces the number of persons normally required for such an operation. A convenient conveyor system has been provided wherein the weights and jackets are easily and conveniently transferred from poured molds to unpoured molds. Means has also been described for providing a sufficient length of track to permit the casting to cool before it is automatically removed from the pallet.

The conveyor system of this invention is ideally suited for use with the Hunter Model HMP10 automatic match plate molding machine which is manufactured by the Hunter Automated Machinery Corporation of Shaumburg, Illinois.

From the foregoing, it can be seen that the conveyor system accomplishes at least all of its stated objectives.

I claim:

1. In combination with a molding machine adapted to form a mold on a bottom board and to eject the bottom board therefrom, the bottom boards being successively ejected from the machine in predetermined intervals, a first support means comprising first and second spaced-apart tracks extending transversely to the direction in which the bottom boards are ejected from the machine, one end of said first and second tracks being positioned adjacent the location where the bottom boards are ejected from the machine, the other ends of said first and second tracks being positioned laterally of the machine, a first carriage movably mounted on said first and second tracks and being movable from a first position adjacent said one end of said first and second tracks to a second position adjacent said other ends of said first and second tracks, a first power means connected to said first carriage means for moving said first carriage means from said first to said second positions, said first carriage means having third and fourth tracks mounted thereon extending transversely to said first and second tracks in a plane thereabove, said third and fourth tracks adapted to movably support a first pallet thereon adapted to receive the bottom board thereon from the molding machine, a second support means having one end positioned adjacent said one end of said first and second tracks and including fifth and sixth tracks thereon adapted to receive said first pallet thereon from said third and fourth tracks after the bottom board and mold has been placed thereon, the successive ejection of bottom boards from the molding machine causing the pallets to be moved from said third and fourth tracks onto said fifth and sixth tracks, the successive movement of the pallets onto said fifth and sixth tracks causing the pallets thereon to be moved from said one end of said second support means to the other end of said second support means, a third support means at the other end of said second support means extending transversely thereto and having one end positioned at the said other end of said second support means, the other end of said third support means being positioned laterally thereof, said third support means having seventh and eighth spaced-apart tracks thereon extending transversely to said fifth and sixth tracks, a second carriage means movably mounted on said seventh and eighth tracks, said second carriage means including ninth and tenth tracks thereon which are parallel to said fifth and sixth tracks and which are adapted to receive a pallet thereon which passes from said other end of said second support means, a second power means connected to said second carriage means for moving said second carriage means from first to second positions on said third support means, a fourth support means parallel to said second support means and positioned laterally thereof, said fourth support means having one end thereof positioned laterally of said one end of said second support means and having its other end positioned laterally of said other end of said second support means, said fourth support means having eleventh and twelfth tracks thereon parallel to said fifth and sixth tracks, said eleventh and twelfth tracks adapted to receive a pallet thereon from said ninth and tenth tracks, a third power means on said second carriage means for moving a pallet from said ninth and tenth tracks, when said second carriage means is in its said second position, onto said eleventh and twelfth tracks, a fifth support means having one end positioned at said one end of said fourth support means extending transversely thereto, said fifth support means having its other end thereof positioned laterally of said one end of said fourth support means, said fifth support means including thirteenth and fourteenth tracks which are transverse to said eleventh and twelfth tracks and parallel to said first and second tracks, a third carriage means movably mounted on said thirteenth and fourteenth tracks between first and second positions, said third carriage means including fifteenth and sixteenth tracks thereon which are parallel to said eleventh and twelfth tracks and which are adapted to receive a pallet thereon, when in its first position, from said eleventh and twelfth tracks, a fourth power means connected to said third carriage means for moving said third carriage means from its first to second positions, a sixth support means having one end thereof positioned laterally of said one end of said fourth support means and including seventeenth and eighteenth tracks thereon parallel to said eleventh and twelfth tracks, said seventeenth and eighteenth tracks adapted to receive a pallet thereon from said fifteenth and sixteenth tracks of said third carriage means when said third carriage means is in its second position, a fifth power means adapted to move the pallet from said third carriage onto said seventeenth and eighteenth tracks, a fourth carriage means movably mounted at the other end of said sixth support means, said fourth carriage means including nineteenth and twentieth tracks thereon which are parallel to said seventeenth and eighteenth tracks, said fourth carriage means being movable from a first position, whereby said nineteenth and twentieth tracks are aligned with the ends of said seventeenth and eighteenth tracks, to a second position laterally thereof, a sixth power means connected to said fourth carriage means for moving said fourth carriage means between its first and second positions, a seventh support means having one end thereof positioned laterally of said other end of said sixth support means and including twenty-first and twenty-second tracks thereon parallel to said seventeenth and eighteenth tracks, said twenty-first and twenty-second tracks adapted to receive a pallet thereon from said fourth carriage means when said fourth carriage means is in its said second position, a seventh power means for moving a pallet from said fourth carriage onto said twenty-first and twenty-second tracks, the outer end of said seventh support means being positioned adjacent one end of said first support means, said twenty-first and twenty-second tracks being aligned with said third and fourth tracks when said first carriage means is in its said second position so that a pallet can roll from said twenty-first and twenty-second tracks onto said third and fourth tracks, and control means for selectively controlling the operation of said first, second, third, fourth, fifth, sixth and seventh power means.

2. The combination of claim 1 wherein a vertically movable member is positioned between said first and second tracks at said one end thereof, said vertically movable member having a plurality of roller elements at its upper end which are rotatable about a horizontal axis parallel to the longitudinal axis of said first and second tracks, said vertically movable member having an eighth power means connected thereto for moving said member between upper and lower positions, said vertically movable member extending upwardly through said first carriage means and the pallet thereon when said first carriage means is in its said first position and said vertically movable member is in its upper position, said roller elements having their upper surfaces thereof positioned in a plane above the pallet on said first carriage so that the bottom board being ejected from the molding machine will roll on said roller elements until it is positioned over said pallet, the movement of said vertically movable member from its upper to lower positions causing the bottom board thereon to be lowered into engagement with the pallet on said first carriage means.

3. The combination of claim 2 wherein a roller conveyor means is positioned between the molding machine and said one end of said support means, said roller conveyor means having a plurality of roller elements mounted thereon which are in the same plane as the roller elements on said vertically movable member when said vertically movable member is in its upper position, said roller conveyor means conveying the bottom boards being ejected from the molding machine to said first carriage means.

4. The combination of claim 1 wherein a conveyor means extends beneath said one end of seventh support means and beneath said fourth carriage means, said seventh support means having means thereon at its said one end which removes the mold and casting from the bottom board on the pallet on said nineteenth and twentieth as said seventh power means moves the pallet from said nineteenth and twentieth tracks onto said twenty-first and twenty-second tracks, the removed mold and casting being deposited in said conveyor means.

5. The combination of claim 4 wherein said first support means includes means for removing the bottom board from said first carriage means as said first carriage means is moving from its said second position to its said first position.

6. The combination of claim 5 wherein said first carriage means includes a roller means extending laterally from its said other end so that the bottom board being removed from the pallet on the first carriage means will be moved outwardly of said seventh support means and outwardly of said first support means.

7. The combination of claim 1 wherein said third power means comprises a cylinder means having a piston rod slidably extending therefrom, said piston rod having a transverse plate means secured to its outer end which is adapted to engage the pallet on said ninth and tenth tracks and to move the pallet onto said eleventh and twelfth tracks as the said piston rod is extended from said cylinder means.

8. The combination of claim 1 wherein said fifth power means comprises a cylinder means having a piston rod slidably extending therefrom, said cylinder means being positioned between said seventeenth and eighteenth tracks below said sixth support means, said cylinder means adapted to extend said piston rod outwardly from the end of said sixth support means between said fifteenth and sixteenth tracks of said third carriage means and beneath the pallet thereon, said piston rod having a pivotal finger means secured to its outer end which pivots beneath the pallet as said piston rod is extended and which engages the pallet to pull the pallet onto said seventeenth and eighteenth tracks as said piston rod is withdrawn into said cylinder means.

9. The combination of claim 1 wherein said seventh power means comprises a cylinder means having a piston rod movably extending therefrom, said cylinder means being positioned between said twenty-first and twenty-second tracks at one end of said seventh support means so that said piston rod may be extended outwardly between said nineteenth and twentieth tracks below the pallet thereon, said piston rod having a pivotal finger at its outer end which pivots beneath the pallet on said nineteenth and twentieth tracks as said piston rod is extended and which engages the said pallet to pull the pallet onto said twenty-first and twenty-second tracks as said piston rod is withdrawn into said cylinder means.

10. The combination of claim 1 wherein said first, second, third, fourth, fifth, sixth and seventh power means are air-operated cylinders having piston rods extending therefrom, said control means comprising solenoid-operated air valves operatively connected to said cylinders and to a source of air under pressure, said control means also comprising a plurality of switch means mounted on the support means adapted to be selectively engaged by the pallets thereon so that the operation of said cylinders will be coordinated with the operation of the molding machine.

11. In combination,
a molding machine adapted to form sand molds on a perforated bottom board and to eject the same therefrom,
a first elongated track means having one end positioned adjacent the ejection end of the molding machine and its other end positioned remotely therefrom, said first elongated track means having a plurality of movable pallets mounted thereon and in an end-to-end relationship from its said one end to its said other end, said first track means adapted to receive a pallet with a bottom board and mold thereon from the molding machine at its said one end,
said first track means having a first operator's station intermediate its ends for placing weights and jackets on the mold, said first track means having a second operator's station between said first station and said other end for pouring the molds,
a second elongated track means parallel to said first track means and laterally spaced therefrom, said second track means having one end positioned laterally adjacent said one end of said first track means and having its other end positioned laterally adjacent said other end of said first track means, said second track means having a plurality of movable pallets mounted thereon in an end-to-end relationship from its said one end to its other end,
a first transfer means at said other ends of said first and second track means adapted to transfer the pallets from said first track means to said second track means,
said second track means having a station adjacent said first station on said first track means for removing the weights and jackets from the molds on the pallets on said second track means and to transfer the same to the said first station,
a third elongated track means parallel to said second track means and laterally spaced therefrom, said third track means having one end positioned laterally adjacent said one end of said second track means and having its other end positioned laterally adjacent said other end of said first track means, said third track means having a plurality of movable pallets mounted thereon in an end-to-end relationship from its said one end to its other end,
a second transfer means at said one end of said second and third track means adapted to transfer the pallets from said second track means to said third track means,
a fourth elongated track means parallel to said third track means and laterally spaced therefrom, said fourth track means having one end positioned laterally adjacent said one end of said third track means and having its other end positioned laterally adjacent said other end of said third track means, said fourth track means having a plurality of movable pallets mounted thereon in an end-to-end relationship from its said one end to its other end,
a third transfer means at said other ends of said third and fourth track means adapted to transfer the pallets from said third track means to said fourth track means,
a mold-removing means at one of said other ends of said third and fourth track means for removing the mold and casting from the pallet as it is being transferred from said third track means to said fourth track means,
a fourth transfer means at the said one end of said fourth track means extending to said one end of said first track means adapted to transfer the pallet moving from said one end of said fourth track means to said one end of said first track means,
power means for moving said pallets on said track means, and control means connected to said power means and said transfer means for coordinating the operation thereof.

12. The combination of claim 11 wherein a conveyor means is positioned at said other ends of said third and fourth track means adapted to receive the removed casting and to convey the same from said track means.

13. The combination of claim 11 wherein a bottom board removing means is positioned adjacent said one end of said fourth track means for removing the bottom board from the pallet being moved from said fourth track means to said first track means.

14. The combination of claim 11 wherein a vertically movable roller means is mounted at said one end of said first track means adapted to extend upwardly through the pallet on said fourth transfer means so that the mold being ejected from the machine will freely roll into position over said pallet, the lowering of said vertically movable roller means causing the mold bottom board to be lowered into engagement with said pallet.

15. The combination of claim 11 wherein the molding machine is an automatic match plate molding machine.

75